(No Model.)

W. B. WALKER.
THILL COUPLING.

No. 428,734. Patented May 27, 1890.

Witnesses.
A. F. Piper
W. E. Piper

Inventor.
William B. Walker
by S. N. Piper, atty.

UNITED STATES PATENT OFFICE.

WILLIAM B. WALKER, OF DOVER, NEW HAMPSHIRE, ASSIGNOR TO ROBERT M. WHITEHOUSE AND BENJAMIN T. WHITEHOUSE, OF SAME PLACE.

THILL-COUPLING.

SPECIFICATION forming part of Letters Patent No. 428,734, dated May 27, 1890.

Application filed September 26, 1889. Serial No. 325,171. (No model.)

*To all whom it may concern:*

Be it known that I, WILLIAM B. WALKER, a citizen of the United States, residing at Dover, in the county of Strafford and State of New Hampshire, have invented certain new and useful Improvements in Thill-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
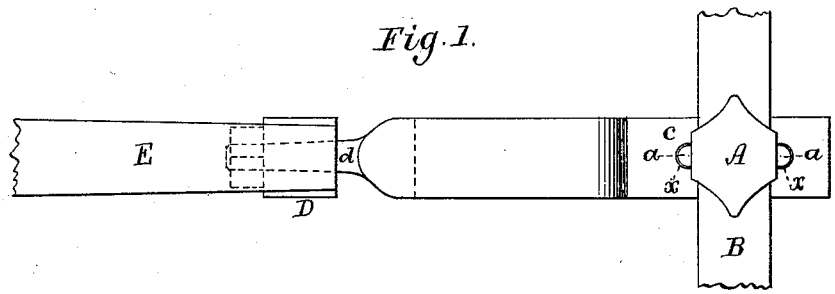
Figure 2:
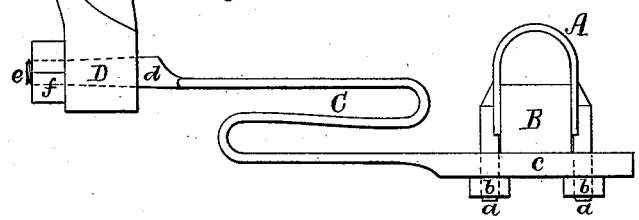
Figure 3:
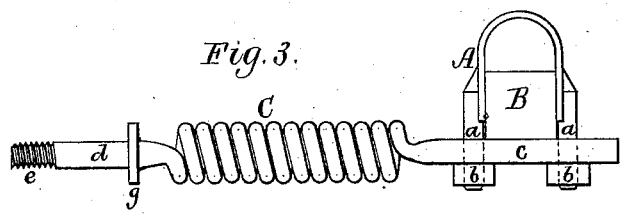

Figure 1 is a top view, and Figs. 2 and 3 side elevations, of a thill-coupling embodying my invention.

The nature of my invention is defined in the claims hereinafter presented.

In the drawings, A denotes the ordinary thill-clip provided with the screws $a$ $a$ and nuts $b$ $b$.

In carrying out my invention I connect the thill E to the axle-tree B by means of a coupling C, which consists of a spring the end of which (marked $c$) is flat and provided with holes $x$ $x$ and constitutes the clip-plate to receive the screws $a$ $a$ for confining said end and the clip to the axle-tree by the nuts $b$ $b$, and at its other or outer end said spring has a shank $d$, which constitutes a bearing for the eye D, secured to the thill E. The bearing of said shank $d$ is represented in Figs. 1 and 2 as tapering and that in the eye D as correspondingly made, the said eye being forced to a seat on said shank by a nut $f$, working on a screw $e$, forming a part of the shank $d$, as represented.

The shank $d$ instead of being tapering may be cylindrical and provided with a shoulder $g$, as shown in Fig. 3, for the said eye to be borne against by the said nut $f$.

The thill-coupling herein described admits of any necessary vertical movements of the thills, and at the same time effectually prevents any rattle in its connection thereto, there being no movement of parts against each other to create the wear which is the cause of the rattle in the couplings in general use.

The drawings illustrate two forms of spring for connecting the thills to the axle-tree; but I do not confine my invention to the springs shown, as other forms may be used without departing from the spirit of my invention.

From the foregoing it will be seen that by providing the spring with the shank $d$, arranged therewith as represented, but a single nut is required to secure the thill to its coupling.

What, therefore, I claim is—

1. The thill-coupling consisting of a spring, one end of which constitutes the clip-plate and the other end provided with a tapering shank, screw-threaded, as shown, in combination with the thill provided with an eye formed to fit said shank and be confined in position thereon by the nut $f$, screwed on said shank, as represented.

2. The thill provided with an eye, the axis of which is at right angles or thereabout to that of the axle, in combination with the coupling, consisting of a spring, one end of which, provided with holes $x$ $x$, constitutes the clip-plate, the other end of said spring having a tapering shank provided with a screw and nut for confining the thill to said shank, as described.

In testimony whereof I affix my signature in presence of two witnesses.

WILLIAM B. WALKER.

Witnesses:
GEORGE E. DURGIN,
GEORGE W. GRAY.